(12) United States Patent
Larsen et al.

(10) Patent No.: US 11,490,605 B2
(45) Date of Patent: Nov. 8, 2022

(54) SYSTEM AND METHOD FOR USE IN FISH FARMING OR MARINE HARVESTING

(71) Applicant: C Robotics AS, Kristiansund N (NO)

(72) Inventors: Kåre Jostein Larsen, Tomrefjord (NO); Kjell Storvik, Kristiansund N (NO)

(73) Assignee: C Robotics AS, Kristiansund N (NO)

( * ) Notice: Subject to any disclaimer, the term of this patent is extended or adjusted under 35 U.S.C. 154(b) by 75 days.

(21) Appl. No.: 16/620,848

(22) PCT Filed: Jun. 13, 2018

(86) PCT No.: PCT/NO2018/050152
§ 371 (c)(1),
(2) Date: Dec. 9, 2019

(87) PCT Pub. No.: WO2018/231064
PCT Pub. Date: Dec. 20, 2018

(65) Prior Publication Data
US 2020/0187469 A1    Jun. 18, 2020

(30) Foreign Application Priority Data

Jun. 13, 2017  (NO) .................................. 20170958
Nov. 8, 2017  (NO) .................................. 20171770

(51) Int. Cl.
*A01K 80/00*    (2006.01)
*A01K 61/10*    (2017.01)

(52) U.S. Cl.
CPC .............. *A01K 80/00* (2013.01); *A01K 61/10* (2017.01)

(58) Field of Classification Search
CPC .................... A01K 80/00; A01K 61/10; A01K 61/50–59
See application file for complete search history.

(56) References Cited

U.S. PATENT DOCUMENTS

| 3,297,980 A | 1/1967 | Haslett |
| 3,624,932 A | 12/1971 | Doyle |

(Continued)

FOREIGN PATENT DOCUMENTS

| CA | 1 168 865 A | 6/1984 |
| CN | 202211089 | 5/2012 |

(Continued)

OTHER PUBLICATIONS

Machine translation of EP-0534881-A1 (Year: 2021).*

(Continued)

*Primary Examiner* — Monica L Barlow
*Assistant Examiner* — Madeline L Douglas
(74) *Attorney, Agent, or Firm* — Kilpatrick Townsend & Stockton LLP

(57) ABSTRACT

A device comprising a body; at least one propulsion unit fixed to the body and configured for moving the device along a sea bed; a collection unit having an inlet opening and a fluid channel extending from the inlet opening; a transport pipe fluidly connected to the fluid channel; and a fluid conveyance unit arranged in connection with the fluid channel and/or the transport pipe and configured to generate a fluid flow from the inlet opening to the transport pipe. There is also provided a method for removing sea floor sediments below a fish farm and a method for sea bed harvesting.

24 Claims, 6 Drawing Sheets

(56) References Cited

U.S. PATENT DOCUMENTS

| | | | | |
|---|---|---|---|---|
| 4,464,851 | A | * 8/1984 | Collier | A01K 80/00 37/309 |
| 2016/0186534 | A1 | 6/2016 | Schilling | |
| 2017/0317765 | A1 | * 11/2017 | Morris | H04L 1/0001 |

FOREIGN PATENT DOCUMENTS

| | | | |
|---|---|---|---|
| CN | 105994198 | | 10/2016 |
| EP | 0534881 | A1 | 3/1993 |
| FR | 2631781 | | 12/1989 |
| GB | 1 207 906 | A | 10/1970 |
| JP | 4880385 | B2 | 10/1973 |
| JP | 5082129 | B2 | 7/1975 |
| JP | 5391990 | B2 | 7/1978 |
| JP | 5486597 | B2 | 6/1979 |
| JP | S559711 | A | 1/1980 |
| JP | S6371128 | A1 | 3/1988 |
| JP | H0643 | A | 1/1994 |
| JP | H0913354 | A | 1/1997 |
| JP | H0944238 | A | 2/1997 |
| JP | H09107842 | A | 4/1997 |
| JP | 2004204440 | | 7/2004 |
| JP | 2004299615 | | 10/2004 |
| JP | 2016031649 | | 3/2016 |
| JP | 2016097774 | | 5/2016 |
| NO | 20092836 | A1 | 2/2011 |
| NO | 20170958 | | 6/2017 |
| NO | 20171770 | | 11/2017 |
| WO | 03088742 | A1 | 10/2003 |
| WO | WO-2015001377 | A1 * | 1/2015 ............. B63B 59/10 |

OTHER PUBLICATIONS

Application No. CL201903625 , Office Action, dated Jan. 12, 2020, 15 pages.
PCT/NO2018/050152; International Search Report and Written Opinion; dated Oct. 4, 2018; 19 pages.
NO 20170958; Search Report; dated Dec. 19, 2017; 2 pages.
NO 20171770; Search Report; dated Mar. 28, 2018; 2 pages.
Application No. JP2019-569940 , Office Action, dated Jan. 31, 2022, 8 pages.

* cited by examiner

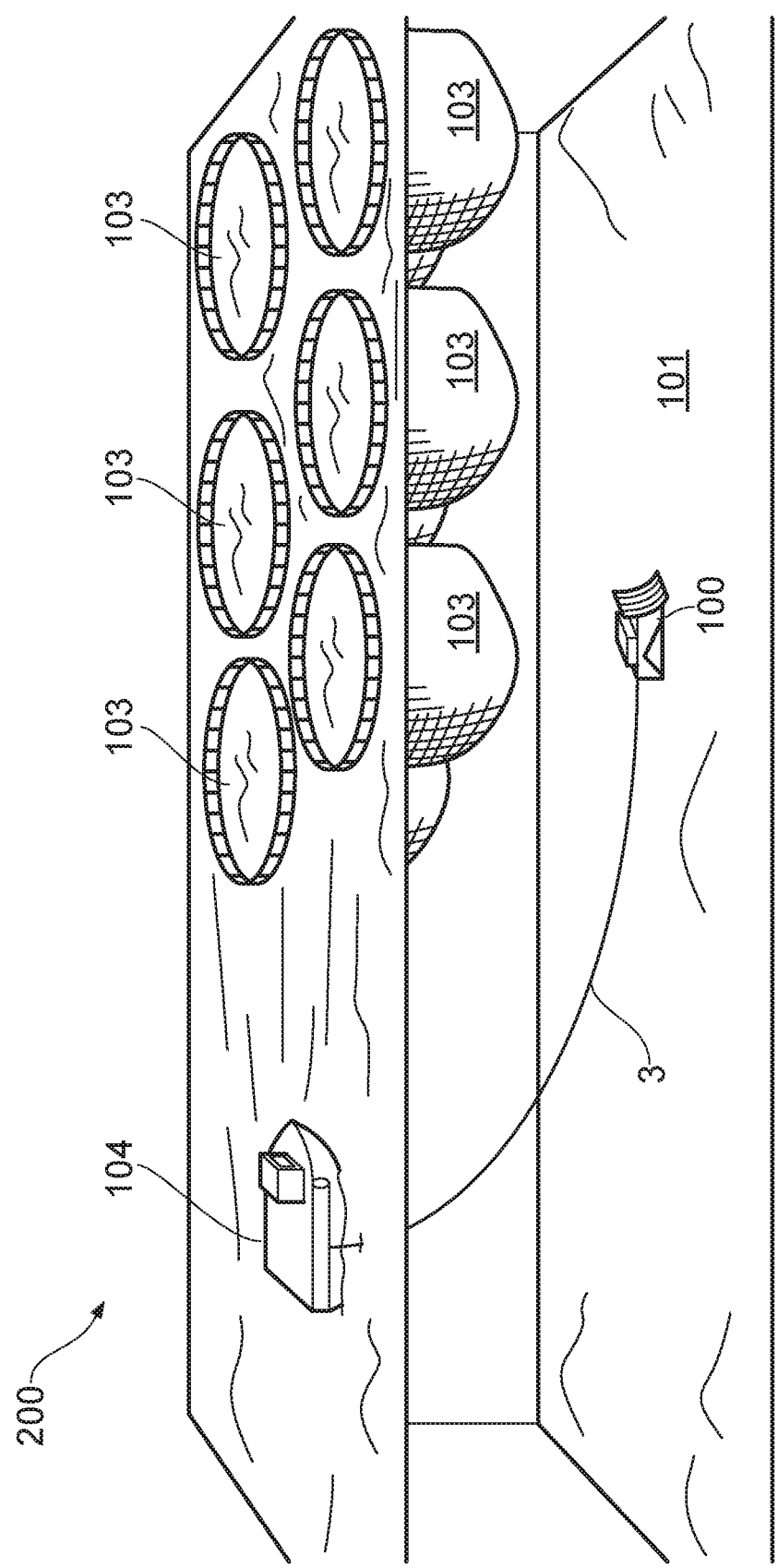

SYSTEM AND METHOD FOR USE IN FISH FARMING OR MARINE HARVESTING

CROSS REFERENCE TO RELATED APPLICATION

This application is a national stage application, filed under 35 U.S.C. § 371, of International Patent Application No. PCT/N02018/050152, filed Jun. 13, 2018, which claims priority to Norwegian Patent Application No. 20170958, filed Jun. 13, 2017 and to Norwegian Patent Application No. 20171770, filed Nov. 8, 2017, which are incorporated by reference herein in their entirety.

The present invention relates to a system and method for use in fish farming or marine harvesting, and more particularly to a system and method for cleaning up sediments from fish farming or for harvesting sea floor organisms.

BACKGROUND

Various methods exist for harvesting marine organisms, such as shellfish, however many of these can damage the sea floor. One example of this is dredging, which engages the entire upper layer of the sea floor by raking or ploughing through the sand and mud. This may damage corals or sea floor flora, and also disturb or damage other marine animals which are not the target for the harvesting. For this reason, dredging or similar methods are banned in various vulnerable areas. A further challenge with such methods is their harsh treatment of the catch, which may damage many types of organisms and animals.

An alternative to such methods is harvesting and collection with divers, however this has the disadvantage of being labour-intensive, not easily scalable to industrial scale harvesting, and carries health and safety risks for the personnel.

Seafood is growing rapidly in importance and is continuously gaining in consumer demand, and there is consequently a need for improved systems and methods for harvesting marine animals and organisms. In one aspect, the present invention has the objective to provide such systems and methods which give advantages over known solutions and techniques.

Fish farming has also grown significantly over the recent years, and further growth is projected. As production intensity has increased, environmental concerns are also being debated. Among such concerns, the increased sea lice levels, the use of medication in the industry and local pollution are among the most prevalent. In order for the industry to continue utilize production sites efficiently, and in order to achieve sustainable growth, there is a need for improved technology to address these concerns. In another aspect, the present invention has the objective to provide such systems and methods which give advantages over known solutions and techniques.

SUMMARY

In an embodiment, there is provided a device comprising: a body; at least one propulsion unit fixed to the body and configured for moving the device along a sea bed; a collection unit having an inlet opening and a fluid channel extending from the inlet opening; a transport pipe fluidly connected to the fluid channel; and a fluid conveyance unit arranged in connection with the fluid channel and/or the transport pipe and configured to generate a fluid flow from the inlet opening to the transport pipe.

In an embodiment, there is provided a method for removing sediments from a sea bed below a fish farm, the method comprising: placing a device on the sea bed; generating a fluid flow by means of a fluid conveyance unit and flowing sediments from the sea bed into an inlet opening; and moving the device by means of at least one propulsion unit.

In an embodiment, there is provided a method for sea bed harvesting comprising: placing a device on the sea bed; generating a fluid flow by means of a fluid conveyance unit; and moving the device by means of at least one propulsion unit.

The appended dependent claims and the detailed description below outline further embodiments.

BRIEF DESCRIPTION OF THE DRAWINGS

Illustrative embodiments of the present invention will now be described with reference to the appended drawings, in which:

FIG. 6 illustrates a fish farm with a device according to an embodiment.

DETAILED DESCRIPTION

Figure 1:
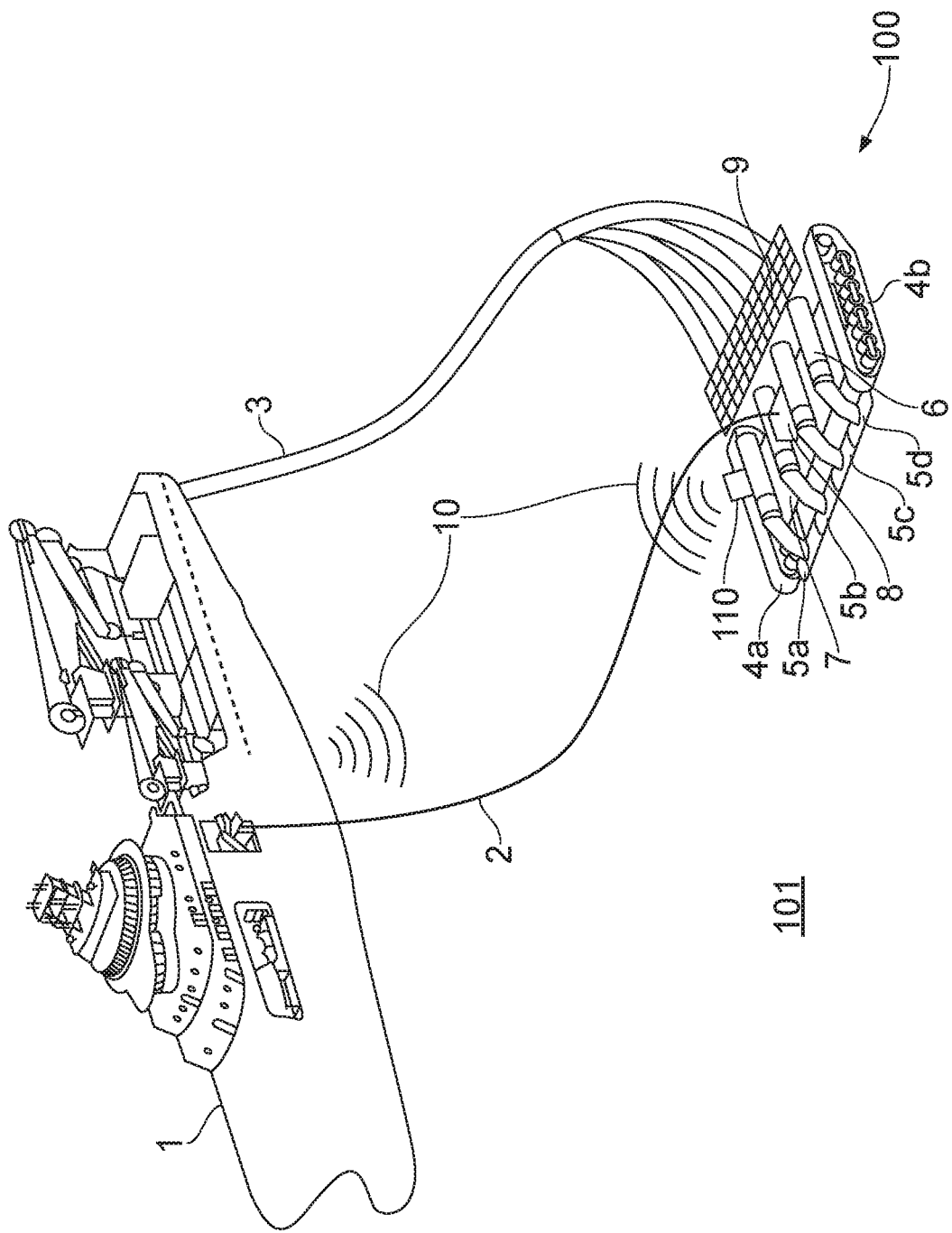
FIG. 1 illustrates a device according to an embodiment.

In an embodiment, illustrated schematically in FIG. 1, there is provided a device 100 for cleaning up sediments, for example organic waste, from a fish farm or for sea bed harvesting, for example harvesting for shellfish. The device may be self-propelled and arranged for operation on the sea floor at shallow, intermediate or deep waters. The device 100 may be supported by, and operated from, a vessel 1. Alternatively, the device 100 may be operated directly from shore, from a quayside, from a floating barge (such as a feeding barge for the fish farm), from an artificial island, a platform, or the like. A transport pipe 3 is arranged to convey collected sediments, waste, catch, harvested items or other items to the vessel 1. (Or alternatively to shore or to an intermediate or temporary storage.)

As shown in FIG. 1, the device 100 has a body 7 with propulsion units 4a and 4b fixed to the body 7. The propulsion units 4a and 4b are configured for moving the device along a sea bed 101. The propulsion units 4a and 4b in this embodiment tracks mounted on track beds which are fixed to the body 7. Alternatively, the propulsion units 4a and 4b may be wheels or any other type suitable for propelling the device 100 along the sea bed 101. The propulsion units 4a, 4b can, for example, be hydraulically or electrically driven and controlled by a controller 8 (described below).

Figure 2:
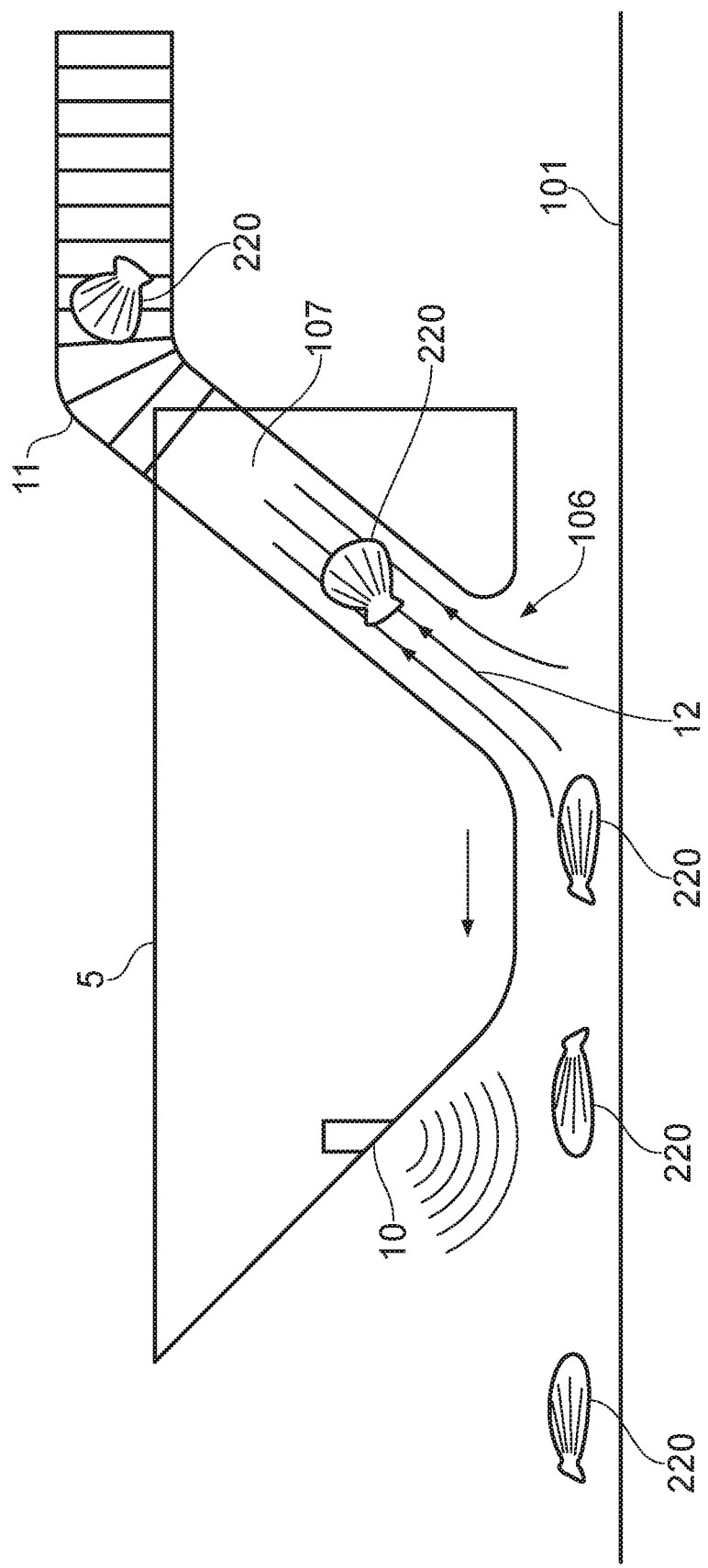
FIG. 2 illustrates details of an embodiment of the device shown in FIG. 1, adapted for sea bed harvesting of shellfish.

Collection units 5a-d for collecting shellfish or other animals, sediments, debris or other items are provided on the device 100. One collection unit 5 is shown in FIG. 2, and will be described in further detail below. The collection unit 5 has an inlet opening 106 and a fluid channel 107 extending from the inlet opening 106.

The transport pipe 3 is fluidly connected to the fluid channel 107 and the device 100 further has a fluid conveyance unit 6 arranged in connection with the fluid channel 107

(via a connection pipe 11 as shown in FIG. 2) and/or the transport pipe 3. In this embodiment, the fluid conveyance unit 6 is arranged between the connection pipe 11 and the transport pipe 3, however it may be arranged elsewhere, such as in (or forming part of) the transport pipe 3.

Figure 4:
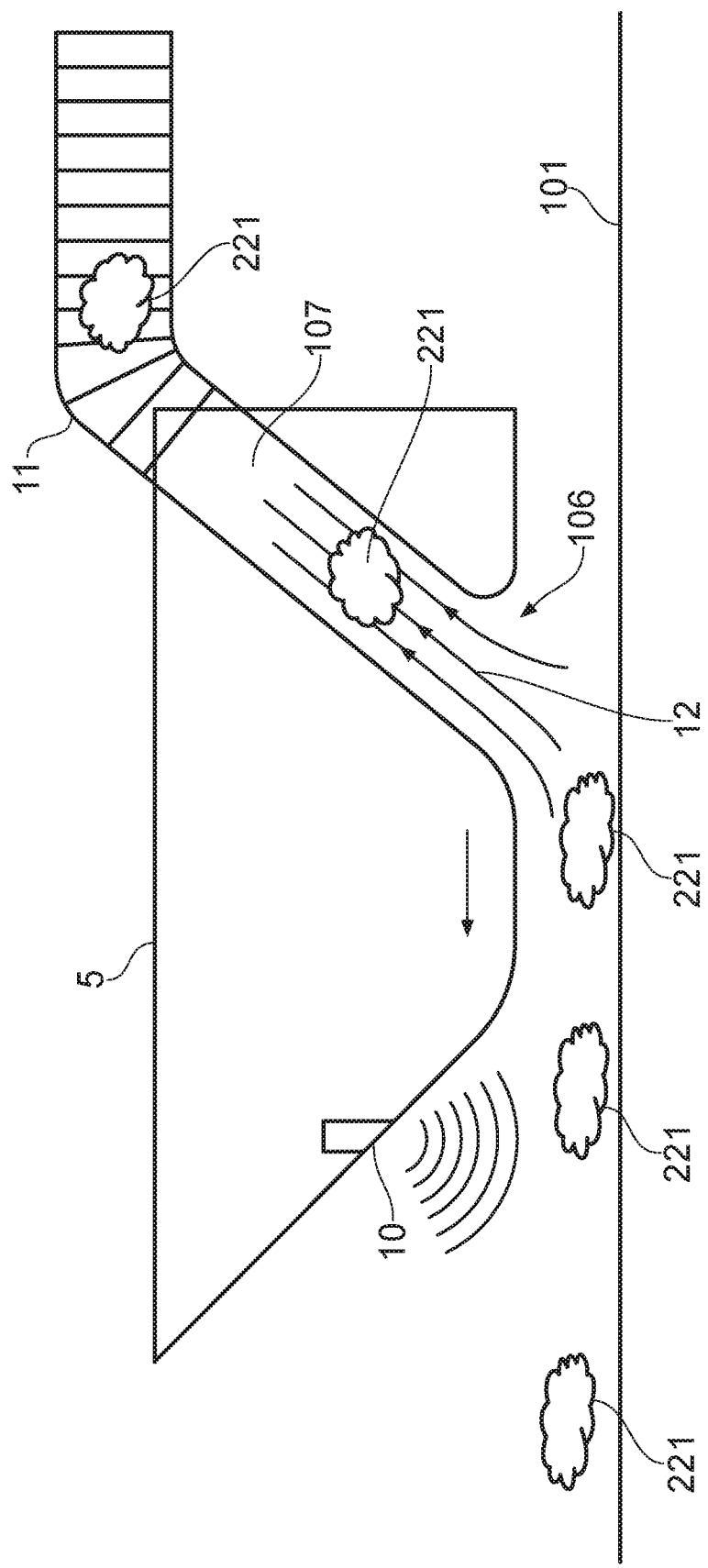
FIG. 4 illustrates details of an embodiment of the device shown in FIG. 1, adapted for cleaning up sea bed sediments.

The fluid conveyance unit 6 is configured to generate a fluid flow, illustrated by arrows 12 in FIGS. 2 and 4, from the inlet opening 106 to the transport pipe 3 and to the vessel 1. By means of the fluid flow 12 and the suction created at the opening 106, harvesting of items, such as shellfish 220, or removal of sediments, debris or other items on the sea floor, illustrated schematically as particles 221, can be done by moving the device 100 along the sea floor 101. The fluid conveyance unit 6 can be any unit suitable for generating a fluid flow 12 through the channel 107 and the transport pipe 3. In the embodiment described here, the fluid conveyance unit 6 is an ejector. The ejector has an injection inlet to inject pressurized fluid, such as seawater, into the elector and thereby into the channel 107 or the transport pipe 3. By means of the resulting reduced pressure in the channel 107, a flow is generated from the opening 106 and up the transport pipe 3 and to the vessel 1. Pressurized liquid for the ejector can be provided via a hose from the vessel 1, which may be part of the umbilical 2, or pressurized liquid may, for example, be provided from a pump on the device 1 for this purpose. Alternatively, the fluid conveyance unit 6 can be a pump on the device 100. The pump may, for example, be electrically or hydraulically powered, with power supplied through the umbilical 2. In yet another alternative embodiment, the fluid conveyance unit 6 can be a gas lift system.

The umbilical 2 extends from the vessel 1 to a coupling box and controller 8 for distribution at the device 1. The umbilical cable 2 may be arranged to provide the device 1 with one or more of electric power, communication signals, hydraulic power, pressurized liquid, or other necessities for the operation of the device 1. The controller 8 is arranged to distribute power and control the operation of the various components on the device 100, such as the propulsion units 4a, 4b.

Figure 3:
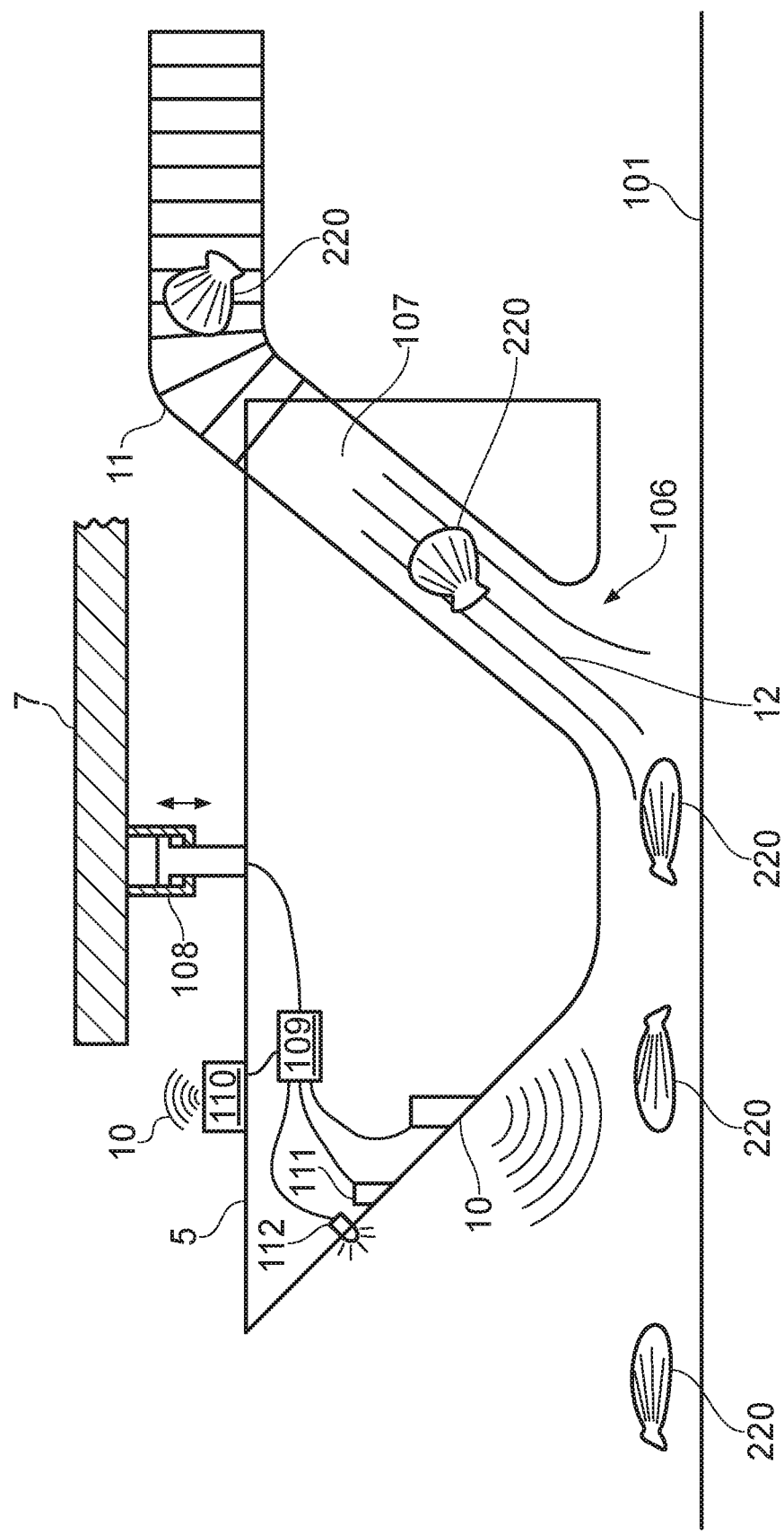
FIG. 3 illustrates details of an embodiment of the device shown in FIG. 1, adapted for sea bed harvesting of shellfish.
Figure 5:
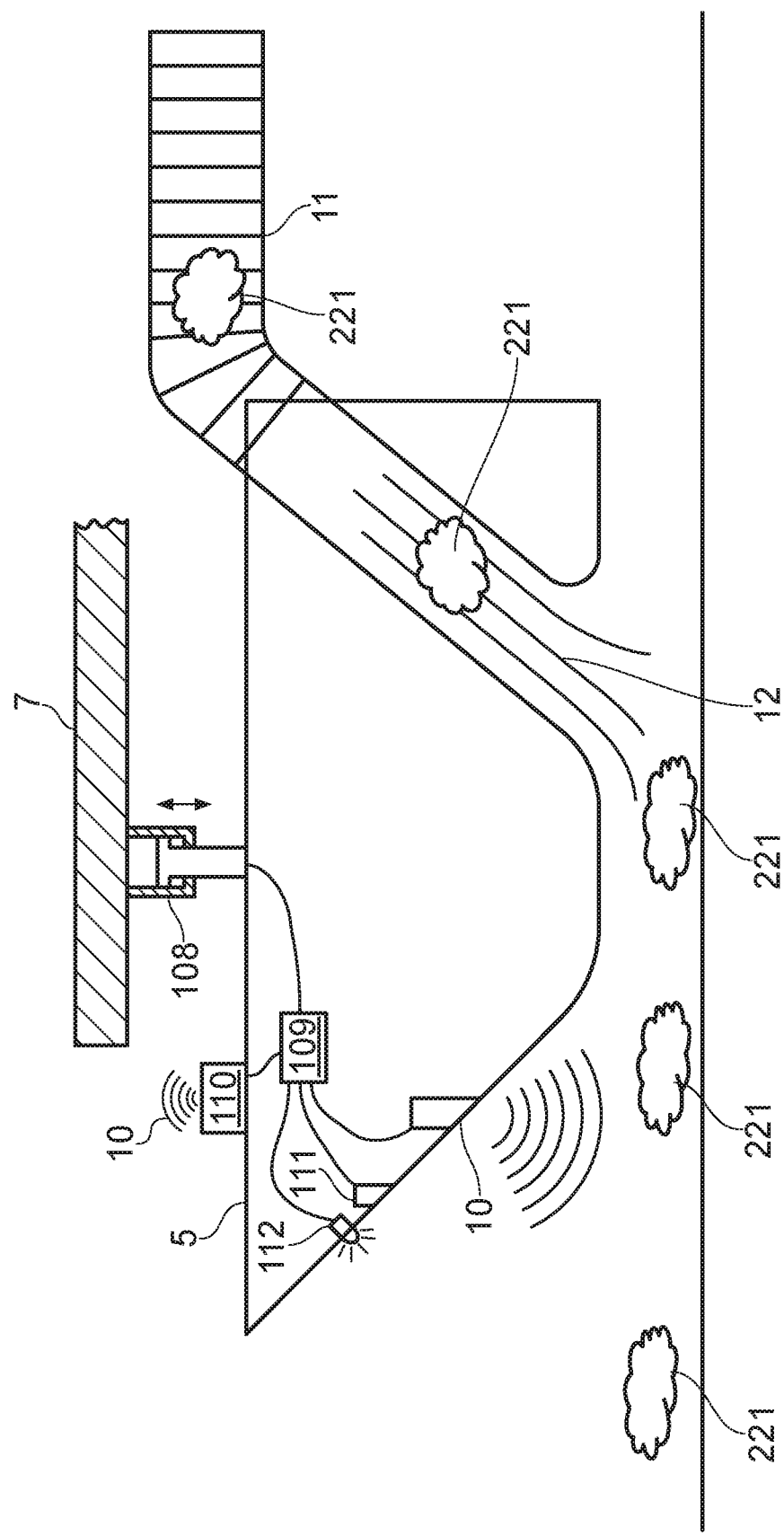
FIG. 5 illustrates details of an embodiment of the device shown in FIG. 1, adapted for cleaning up sea bed sediments.

Referring now to FIGS. 3 and 5, which shows an alternative embodiment, the device 100 may comprise an actuator 108 operable to, in use, adjust the vertical distance between the inlet opening 106 and the sea bed 101. In the embodiment shown in FIGS. 3 and 5, the actuator 108 is a hydraulic cylinder arranged between the collection unit 5 and the body 7. The actuator 108 may alternatively be, for example, and electric actuator. By means of the actuator 108, the distance between the opening 106 and the sea bed 101 can thereby be adjusted such as to optimize the operation of the unit, for example to maximize the collection of sediments or shellfish while avoiding excessive amounts of debris or sand from the sea floor in the fluid flow 12 to the vessel 1. This adjustment can also be used to minimize damage to the sea bed 101 during operation, optionally.

The actuator 108 can alternatively be arranged differently, to regulate the distance between the opening 106 and the sea bed 101 in a different manner. For example, the propulsion units 4a, 4b may be movable in relation to the body 7, whereby the actuator 108 can be arranged to raise or lower the body 7 in relation to the propulsion units 4a, 4b, and thereby achieve the same effect.

In an embodiment, a sensor 10 may be provided to measure a distance between the collection unit 5 and the sea bed 101 and to provide a signal indicative of the distance. The sensor 10 may be connected to a controller 109, also connected to the actuator 108 and where the controller 109 is arranged to automatically regulate the height of the collection unit 5 based on the sensor signal. A substantially constant distance between the opening 106 and the sea bed 101 can thereby be achieved by such automatic control.

In an embodiment, the device 100 may also comprise a wireless communications unit 110 configured for sending or receiving wireless communication signals 10 to surface. The vessel 1 may also have an equivalent or complementary sender and/or receiver. This enables seamless communication between the vessel 1 and the device 100. The wireless communications unit 110 may, for example, be an acoustic communication system or a sonar. This allows, for example, the location, direction of travel and/or speed of the device 100 to be monitored from the vessel 1, or vice versa. The wireless communications unit 110 may also be used for data transfer, and thereby be used as an alternative to, or in addition to, any communication provided over the umbilical 2.

In an embodiment, the wireless communications unit 110 is operated to provide a tracking capability between the vessel 1 and the device 100. This may be implemented such that the position of the vessel 1 is identified by the device 100 and the device 100 is operated (by means of the controller 8 and the propulsion units 4a, 4b) to follow the vessel 1. Alternatively, the vessel 1 can be operated to follow the device 100 in a similar manner. A dynamic positioning propulsion system on the vessel 1 may, for example, be employed for this purpose, to allow accurate positioning and tracking of the device 100. Accurate position monitoring allows the device 100 to cover the entire sea floor below the fish farm, or the entire desired catch area, in order to maximize collection of sediments or catch.

Preferably, the device 100 comprises two or more collection units 5a-d, as illustrated in FIG. 1. The units 5a-d may be configured in parallel, such as to cover a wider area on the sea bed 101. Alternative arrangements are possible, for example in a row in the direction of travel of the device 100, in order to improve collection efficiency. Several collection units 5a-d may be arranged to supply to a common transport pipe 3, as illustrated in FIG. 1. Alternatively, several transport pipes 3 may be used.

In an embodiment, the device 100 comprises a sorting unit 9 is arranged in the fluid channel 107 and/or in the transport pipe 3. The sorting unit 9 is arranged to sort the incoming fluid flow 12, and to remove elements from the fluid flow 12. For example, the sorting unit 9 may comprise one or more screens or sieves arranged horizontally or slightly angled in the fluid channel 107 and open to the outside of the device 100, such that the fluid flow 12 passes above the screen or sieve, whereby small and heavy items such as sand and rocks drops out by gravity or centrifugal force and is discharged from the device 100 and back on the sea bed 101. In the embodiment shown in FIGS. 4 and 5, lighter sediments may pass through the sorting unit 9 and into the transport pipe 3. In the embodiment shown in FIGS. 2 and 3, larger elements, such as shellfish, may pass through the sorting unit 9 and to the transport pipe 3. This reduces the amounts of debris or undesired components being collected and transported to the vessel 1.

In an embodiment, the device 100 may be equipped with a camera 111 and/or a light source 112, as shown in FIG. 3. The camera 111 and/or the light source 112 may be connected to the controller 109, which may again be connected to the wireless communications unit 110 or to the umbilical cable 2 to allow picture or video signals to be transferred to the vessel 1. This provides the opportunity to monitor sea floor conditions by an operator, for example to provide information on the amount of sediments which has accumulated on the sea floor 101, or the amount of potential catch. The camera 111 can also be used to avoid running the device 100 into obstacles on the sea floor 101.

In an embodiment, the device 100 comprises a sonar configured to detect obstacles on the sea bed 101. In this embodiment, the sonar is arranged as part of the sensor 10 and connected to the controller 109, whereby both the distance between the collection unit 5 and the sea bed 101 and the presence of, and if desired the distance to, any objects on the sea bed 101 in front of the device 100. The sonar may alternatively be arranged as an independent unit, separate from the sensor 10. Such early obstacle detection by sonar helps avoid collisions and orientation of the device 100 in conditions with low visibility.

FIG. 6 illustrates a fish farm 200 having a device 100 according to one of the embodiments described in FIG. 4 or 5. The fish farm 200 comprises a plurality of pens 103 and a feeding barge 104, in the conventional manner. The device 100 is provided to clean up sediments under the pens 103. The transport pipe 3 is in this embodiment connected to the feeding barge 104. As noted above, the transport pipe 3 may, alternatively, be connected for example to a vessel (such as a service boat of the fish farm 200), a dedicated barge for this purpose, or to shore. Treatment systems, such as a separator, and storage tanks may be provided to handle the stream coming from the device 100. In this manner, sediments can be separated from sea water and sent for further treatment or disposal.

According to embodiments, as described above, more efficient and environmentally friendly fish farming can be achieved. Efficient collection of sediments, as well as monitoring of sea bed conditions, is made possible, with low harm to the sea floor. The system and method may be used for regular collection of sediments and monitoring of sea floor conditions. Removal of sediments can also lead to improved production from the fish farm, in that eliminating gases generated by for example biological waste on the sea floor improves the environmental conditions in the pens.

According to other embodiments, as described above, more efficient and environmentally friendly harvesting of marine organisms can be achieved, and the process is less harmful to the catch and/or to the marine environment at the catch site. The system and method may be used for regular harvesting of marine animals, and/or for removing or moving undesired animals or other items, such as debris, for example from beach areas or the like. In certain embodiments, health and safety benefits can be realized compared to current, manual techniques for these purposes.

Embodiments described herein may also enable harvesting in currently inaccessible areas, such as around Svalbard or other arctic areas which have large marine resources but in which current harvesting is not possible for technical and/or regulatory reasons.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The present invention is not limited to the embodiments described herein; reference should be had to the appended claims.

The invention claimed is:

1. A device comprising:
a body;
at least one propulsion unit fixed to the body and configured for moving the device along a sea bed;
two or more collection units configured in parallel or in a row in a direction of vehicle travel, each collection unit having an inlet opening and a fluid channel extending from the inlet opening;
a transport pipe fluidly connecting the fluid channel to a floating vessel, barge, or shore location;
a fluid conveyance unit arranged in connection with the fluid channel and/or the transport pipe and configured to generate a fluid flow from the inlet opening to the transport pipe such that, by moving the device along a sea floor, harvesting or removal of items on the sea floor can be performed based on the fluid flow and suction created at the opening.

2. The device of claim 1, further comprising an actuator, the actuator configured to, in use, adjust a vertical distance between the inlet opening and the sea bed.

3. The device of claim 2, wherein the actuator is arranged to:
move the collection unit in relation to the body and/or move the at least one propulsion unit in relation to the body.

4. The device of claim 1, further comprising a sensor operable to measure a distance between the collection unit and the sea bed and to provide a signal indicative of the distance.

5. The device of claim 1, further comprising a sonar configured for detecting obstacles on the sea bed.

6. The device of claim 2, further comprising a controller operable to control at least one of:
the actuator, and
the at least one propulsion unit.

7. The device of claim 6, further comprising a sensor operable to measure a distance between the collection unit and the sea bed and to provide a signal indicative of the distance, and wherein the controller is configured to receive the signal and automatically control the actuator in response to the signal.

8. The device of claim 6, further comprising a sonar configured for detecting obstacles on the sea bed, and wherein the controller is configured to control the at least one propulsion unit in response to a signal from the sonar.

9. The device of claim 1,
further comprising an umbilical cable configured to supply the device with communication signals, the umbilical cable further configured to supply the device with at least one of electric power, hydraulic power, and pressurized fluid.

10. The device of claim 1, wherein the fluid channel of each of the collection units extends from the respective inlet opening, the transport pipe fluidly connecting the fluid channels of each of the collection units to the floating vessel, barge, or shore location.

11. The device of claim 10, wherein the transport pipe is a common transport pipe for the two or more collection units.

12. The device of claim 1, wherein:
the fluid conveyance unit is a pump,
the fluid conveyance unit is a gas lift system, or
the fluid conveyance unit is an ejector.

13. The device of claim 1, comprising a sorting unit arranged in the fluid channel and/or in the transport pipe, the sorting unit configured to remove elements from the fluid flow.

14. The device of claim 1, comprising a camera and/or a light source arranged on the device.

15. A method for removing sediments from a sea bed below a fish farm, the method comprising:
placing a device on the sea bed, the device comprising:
a body;
at least one propulsion unit fixed to the body and configured for moving the device along a sea bed;
two or more collection units configured in parallel or in a row in a direction of vehicle travel, each collection unit having an inlet opening and a fluid channel extending from the inlet opening;
a transport pipe fluidly connecting the fluid channel to a floating vessel, barge, or shore location;
a fluid conveyance unit arranged in connection with the fluid channel and/or the transport pipe and configured to generate a fluid flow from the inlet opening to the transport pipe;
generating the fluid flow by means of the fluid conveyance unit and flowing sediments from the sea bed into the inlet opening based on the fluid flow and suction created at the opening; and
moving the device by means of the at least one propulsion unit.

16. The method of claim 15, wherein the step of operating the device from the floating vessel, from the barge, or from the shore location comprises:
receiving a signal from the device indicative of a position of the device on the sea bed, and
in response to a change in the signal, operating the at least one propulsion unit on the vessel to follow a movement of the device.

17. The method of claim 15, comprising at least one of:
regulating the fluid flow from the inlet opening to the transport pipe, or
adjusting a vertical distance between the inlet opening and the sea bed.

18. The method of claim 15, comprising: receiving the fluid flow on a vessel, on a barge or on a shore location.

19. A method for sea bed harvesting comprising:
placing a device on the sea bed, the device comprising:
a body;
at least one propulsion unit fixed to the body and configured for moving the device along a sea bed;
two or more collection units configured in parallel or in a row in a direction of vehicle travel, each collection unit having an inlet opening and a fluid channel extending from the inlet opening;
a transport pipe fluidly connecting the fluid channel to a floating vessel, barge, or shore location; and
a fluid conveyance unit arranged in connection with the fluid channel and/or the transport pipe and configured to generate a fluid flow from the inlet opening to the transport pipe;
generating the fluid flow by means of the fluid conveyance unit based on the fluid flow and suction created at the opening; and
moving the device by means of the at least one propulsion unit.

20. The method of claim 19, comprising
operating the device from a vessel; and
receiving the fluid flow on the vessel.

21. The method of claim 20, wherein the step of operating the device from the vessel comprises:
receiving a signal from the device indicative of a position of the device on the sea bed, and
in response to a change in the signal, operating a propulsion system on the vessel to follow a movement of the device.

22. The method of claim 20, wherein the step of operating the device from the vessel comprises:
providing a signal from the vessel to the device, the signal indicative of a position of the vessel, and
in response to a change in the signal, operating the at least one propulsion unit to follow a movement of the vessel.

23. The method of claim 20, comprising:
providing a signal from the vessel to the device to operate the at least one propulsion unit to move the device on the sea bed.

24. The method of claim 19, comprising at least one of:
regulating the fluid flow from the inlet opening to the transport pipe, or
adjusting a vertical distance between the inlet opening and the sea bed.

* * * * *